(12) United States Patent
Brandau et al.

(10) Patent No.: US 9,306,437 B2
(45) Date of Patent: Apr. 5, 2016

(54) METHOD FOR PRODUCING A STATOR

(75) Inventors: Rüdiger Brandau, Alheim (DE); Kurt Siebald, Rotenburg (DE)

(73) Assignee: Continental Automotive GmbH, Hannover (DE)

( * ) Notice: Subject to any disclaimer, the term of this patent is extended or adjusted under 35 U.S.C. 154(b) by 165 days.

(21) Appl. No.: 13/992,968

(22) PCT Filed: Dec. 8, 2011

(86) PCT No.: PCT/EP2011/072178
§ 371 (c)(1),
(2), (4) Date: Jun. 10, 2013

(87) PCT Pub. No.: WO2012/076644
PCT Pub. Date: Jun. 14, 2012

(65) Prior Publication Data
US 2013/0263439 A1  Oct. 10, 2013

(30) Foreign Application Priority Data

Dec. 10, 2010 (DE) .......................... 10 2010 054 176

(51) Int. Cl.
| | |
|---|---|
| H02K 15/00 | (2006.01) |
| H02K 15/14 | (2006.01) |
| H02K 15/16 | (2006.01) |
| H02K 15/02 | (2006.01) |
| H02K 1/14 | (2006.01) |
| H02K 15/04 | (2006.01) |
| H02K 15/12 | (2006.01) |

(52) U.S. Cl.
CPC ............... *H02K 15/02* (2013.01); *H02K 1/148* (2013.01); *H02K 15/022* (2013.01); *H02K 15/0442* (2013.01); *H02K 15/12* (2013.01); *Y10T 29/49011* (2015.01)

(58) Field of Classification Search
USPC ................ 29/592.1, 596, 598, 605, 606, 609; 310/90, 179, 184, 198, 208, 215, 258, 310/259
See application file for complete search history.

(56) References Cited

U.S. PATENT DOCUMENTS

| | | | |
|---|---|---|---|
| 5,806,169 A | 9/1998 | Trago et al. | |
| 5,859,486 A * | 1/1999 | Nakahara et al. | 310/216.004 |
| 5,924,186 A * | 7/1999 | Nakagawa et al. | 29/602.1 |
| 6,211,587 B1 * | 4/2001 | Enomoto et al. | 310/52 |
| 7,521,828 B2 * | 4/2009 | Ogawa et al. | 310/71 |
| 7,732,969 B2 * | 6/2010 | Ishizeki et al. | 310/194 |
| 2004/0034988 A1 | 2/2004 | Neal | |
| 2007/0182271 A1 | 8/2007 | Sugishima et al. | |
| 2010/0107401 A1 | 5/2010 | Suzuki et al. | |

FOREIGN PATENT DOCUMENTS

| | | |
|---|---|---|
| CN | 101752914 | 6/2010 |
| DE | 696 01 623 T2 | 12/1999 |

(Continued)

*Primary Examiner* — Paul D Kim
(74) *Attorney, Agent, or Firm* — Cozen O'Connor

(57) ABSTRACT

A method for producing a stator for an electrical machine as an internal rotor, in particular an electric motor. This method involves providing a multiplicity of separate pole teeth, which are wound. The ends of the winding wire of the pole teeth are connected to one another to create a flexible annular pole tooth assembly, and the flexible assembly is inserted into an injection mold and centered. The assembly located in the mold is encapsulated or sealed in a molding compound. In this way, a dimensionally stable stator with particularly good insulating properties can be produced.

9 Claims, 5 Drawing Sheets

(56) References Cited

FOREIGN PATENT DOCUMENTS

| DE | 10 2004 027 380 A1 | 12/2005 |
| DE | 10 2007 006 095 A1 | 8/2007 |
| DE | 20 2010 003 640 U1 | 7/2010 |
| JP | 8-265995 A | 10/1996 |
| JP | 2008-236921 A | 10/2008 |
| JP | 2009-261150 A | 11/2009 |

* cited by examiner

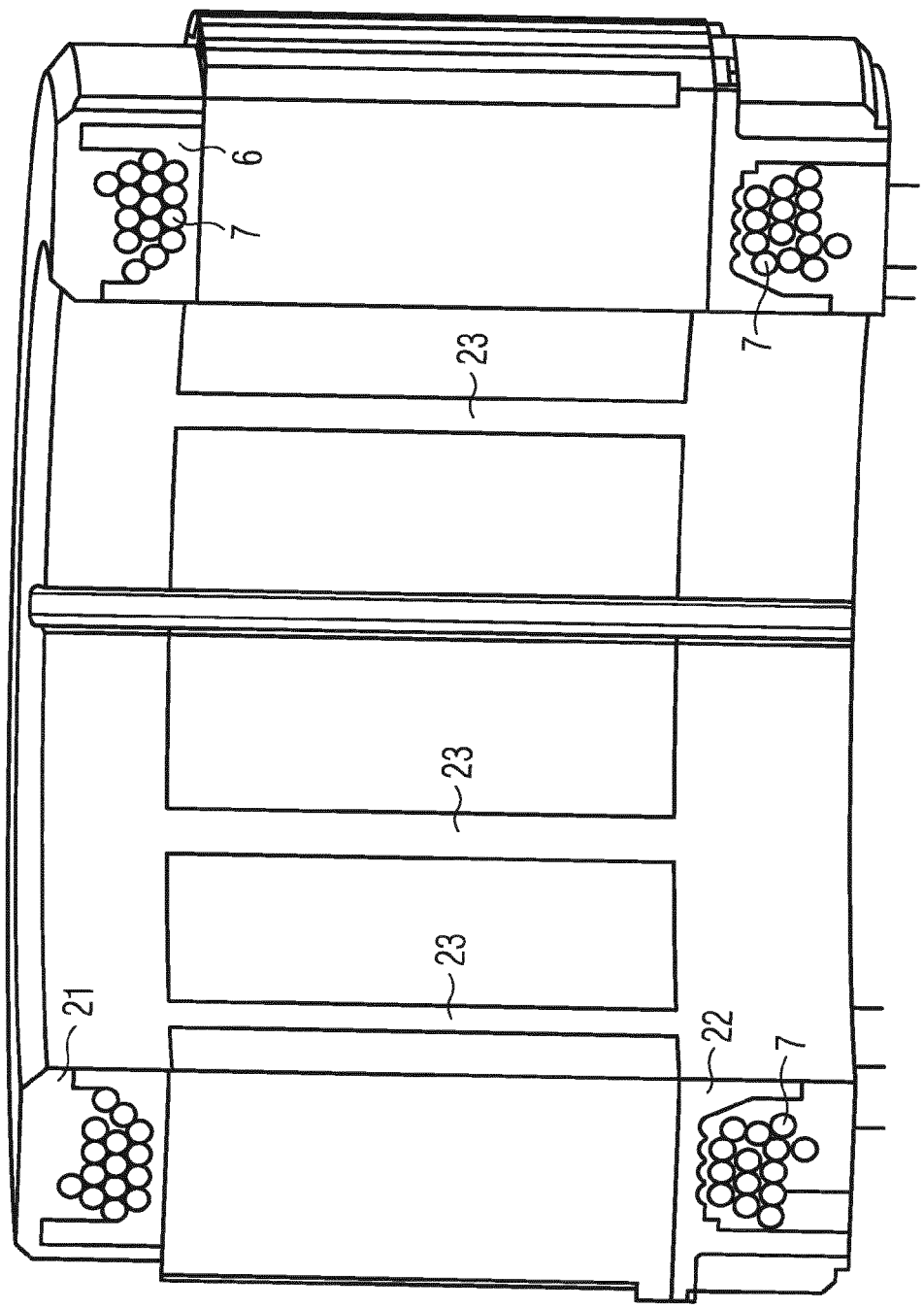

METHOD FOR PRODUCING A STATOR

CROSS REFERENCE TO RELATED APPLICATIONS

This is a U.S. national stage of application No. PCT/EP2011/072178, filed on 8 Dec. 2011. Priority is claimed on German Application No.: 10 2010 054 176.1 filed 10 Dec. 2010, the content of which is incorporated here by reference.

BACKGROUND OF THE INVENTION

1. Field of the Invention

The present invention relates to a method for producing a stator for an internal-rotor electric machine, in particular an electric motor.

2. Description of Prior Art

The standard is for stators to be produced from a stack of sheet-metal rings arranged one above the other, Together these sheet-metal rings form a solid component, which is insulated and wrapped in subsequent steps.

It is also already known from DE 20 2010 003 640 U1 to provide individual pole teeth with coil formers and to wrap them correspondingly. In this way, individual electric machine coils are produced that comprise a pole tooth, a coil former and a winding. In this case, a plurality of these electric machine coils can be assembled to form a stator, wherein provision is made for the electric machine coils to be arranged in the form of a ring around the stator central axis. In this publication, however, no mention is made of the connection of the individual electric machine coils.

A method for producing a stator is known from JP 2008-236921 A. DE 10 2007 006 095 A1 discloses fastening a temporary fastening ring on an outer circumferential face of a stator. The temporary fastening ring is intended to prevent a movement of the individual core elements in the radial direction during the shaping process of the connecting wires.

SUMMARY OF THE INVENTION

The present invention is based on the object of providing a method for producing a stator, with which a stator with a compact design can be produced which is characterized by particularly good insulating properties.

During the stator production implemented in accordance with one embodiment of the invention, separate pole teeth are used as the basis, which pole teeth are provided with windings to produce corresponding coils. Then, a flexible ring-shaped pole tooth assembly (coil assembly) is produced from a plurality of coils by connecting the winding wire ends, which pole tooth assembly is then introduced into an injection mold, centered there, and encapsulated by casting with a plastic compound. During the injection molding, the regions between the pole teeth (between the corresponding windings of the pole teeth) are cast. In addition, the regions above and below the pole teeth are cast, with the result that a rigid overall structure is produced. The flexible ring-shaped pole tooth assembly with the associated windings is thus completely encapsulated, apart from the outer faces of the two end-face walls (the inner and outer end-face walls). A plastic structure is formed that comprises an upper and a lower end wall and a multiplicity of web-like intermediate walls, with the pole tooth assembly being embedded in said structure.

According to one embodiment of the invention, a strong magnetic field can be achieved given a correspondingly small physical space. Owing to the fact that the pole teeth are wrapped individually and the corresponding pole tooth assembly is assembled, there is only a small cavity available between the windings of adjacent pole teeth that is filled with plastic compound by virtue of the injection molding process. Overall, this results in particularly good insulation properties for the stator produced.

The flexible ring-shaped pole tooth assembly is stabilized by the attachment of an outer ring. With the aid of the outer ring, the assembly can be introduced directionally into the injection mold, in particular arranged in a pick-and-place tool of the injection mold and then introduced into the mold. The subsequent centering can be performed, for example, using mold slides during closing of the injection mold. In this way, the assembly can also be brought to the desired diameter. Once the pole tooth assembly has been introduced into the injection mold, the attached outer ring is removed.

In one embodiment of the invention, the multiplicity of pole teeth are provided with at least one protective cap prior to the wrapping for insulation purposes. Preferably, various protective caps are used per pole tooth. These caps protect against a short circuit of the associated voltage supply.

The winding ends of the pole teeth are preferably connected to one another via a welding process. It is important that the pole teeth are only connected to one another via the winding wire ends in order that the pole tooth assembly produced has sufficient flexibility. In this way, the pole tooth assembly can easily be brought to the desired diameter after introduction into the injection mold, for example by pressure being exerted in the radial direction.

In one embodiment of the invention, the multiplicity of pole teeth are provided with an overmolding prior to the wrapping for insulation purposes. This method procedure can be used, for example, instead of the abovementioned use of protective caps to safeguard against short circuits of the associated voltage supply. Corresponding insulating varnishes based on plastics can be used for such overmoldings.

In a preferred embodiment of the invention, pole teeth are used that can be positioned against one another in a form-fitting manner to safeguard against displacement. Thus, for example, the pole teeth of a pole tooth assembly can be connected to one another in a form-fitting manner via tongue-and-groove joints once they have been centered in the injection mold and brought to the desired diameter. In this way, fixing of the pole teeth prior to the casting of the plastic compound is achieved.

BRIEF DESCRIPTION OF THE DRAWINGS

The invention will be explained in detail below with reference to an exemplary embodiment in conjunction with the drawing, in which:

FIG. 6 is a longitudinal section through a finished stator provided with an overmolding.

DETAILED DESCRIPTION OF THE PREFERRED EMBODIMENTS

Figure 1:
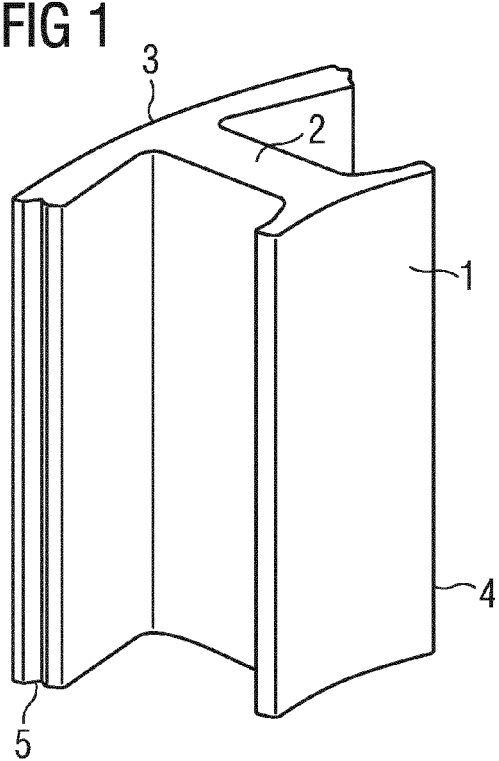
FIG. 1 is a three-dimensional view of a pole tooth, which is used in the method according to the invention.

In the method according to the invention, a multiplicity of pole teeth 1 of the type shown in FIG. 1 are provided. These pole teeth 1 are approximately in the form of a double T in cross section and have a first (inner) end-face wall 4, a second (outer) end-face wall 3 and a pole tooth web 2 connecting the end-face walls 4, 3 to one another. A groove 5 is provided at one end of the outer end-face wall 3, while the opposite end has a correspondingly formed tongue. The tongues and grooves are used for attaching adjacent pole teeth to one another in a form-fitting manner.

The pole teeth 1 comprise a stamped stack of individual sheet-metal layers arranged one above the other and are provided with various protective caps 6 on the stack for insulation purposes.

Figure 2:
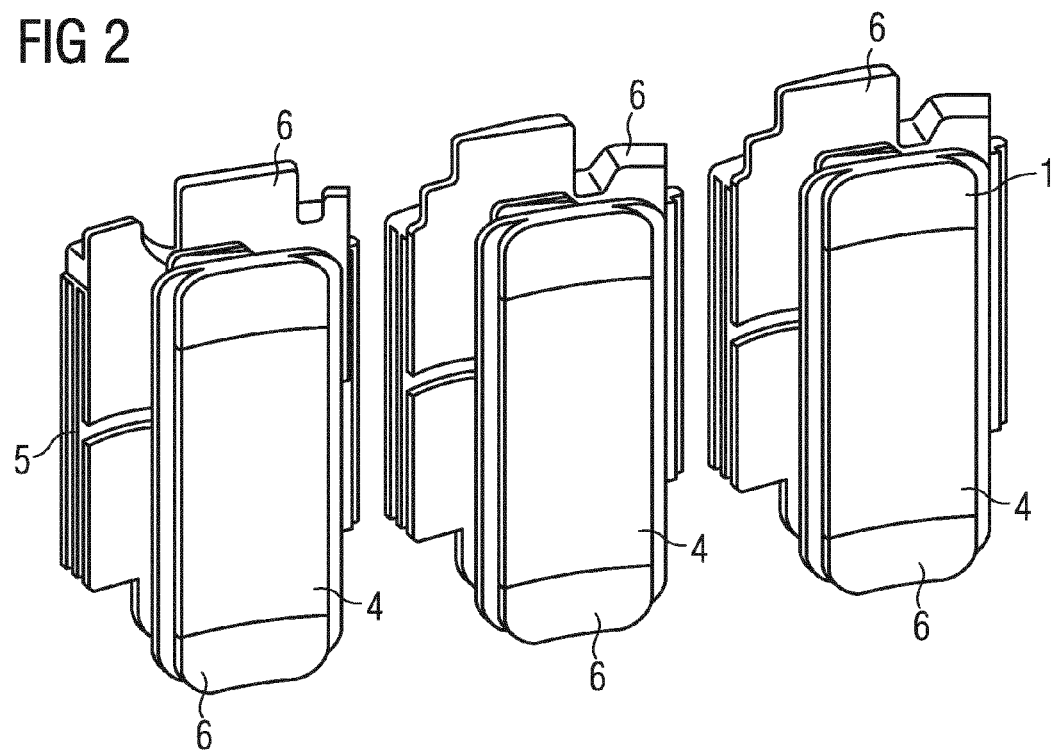
FIG. 2 is a three-dimensional view of a plurality of wrapped pole teeth provided with plastic caps prior to assembly to form a pole tooth assembly.

FIG. 2 shows such protective caps 6. These caps protect against short circuits of the voltage supply. The pole teeth 1 are then wrapped. Corresponding windings are denoted by 7 in FIG. 3. The wrapping of the pole teeth 1 can in this case take place individually or in parallel. The corresponding winding wires are then connected to one another via a welding process, with the result that a flexible assembly 20 is produced, as shown in FIG. 3.

Figure 3:
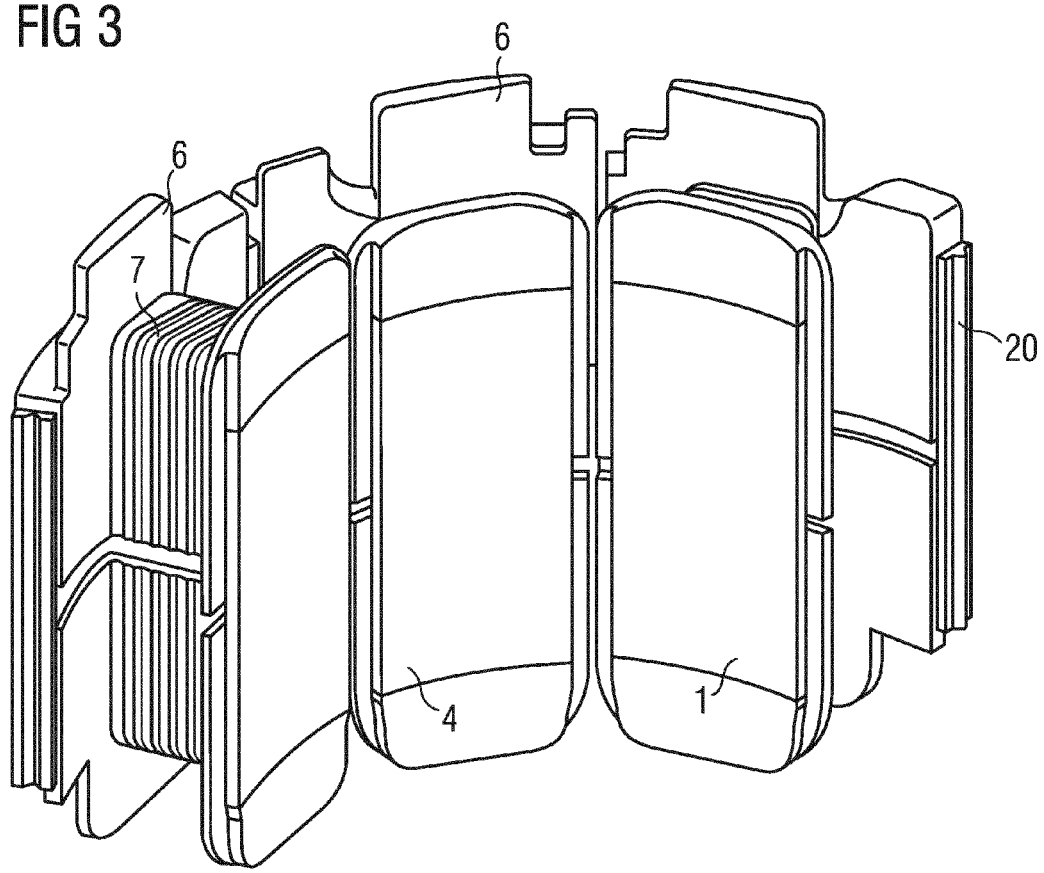
FIG. 3 is the pole teeth in FIG. 2 after assembly to form a pole tooth assembly.

FIG. 3 shows a flexible pole tooth assembly 20 with only three pole teeth 1. It goes without saying, however, that a flexible pole tooth assembly 20 in the form of a closed ring is formed. For stabilization purposes, the flexible ring-shaped pole tooth assembly 20 is arranged and fixed in an outer ring (not shown). With this ring, the assembly is arranged in a pick-and-place tool of an injection mold 8 and thereby introduced directionally into the injection mold 8 (FIG. 4).

Figure 4:
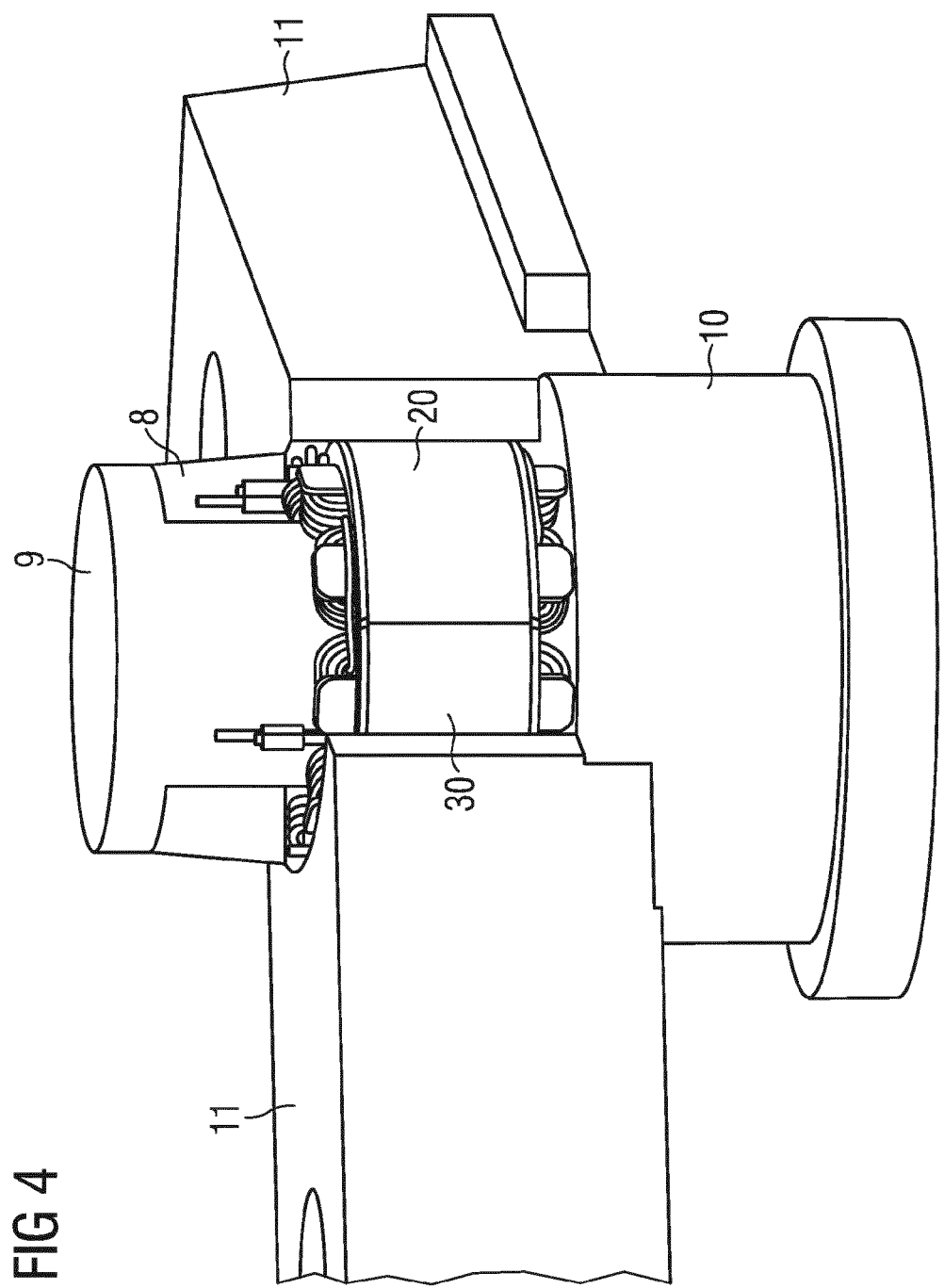
FIG. 4 is a schematic three-dimensional illustration, partially sectioned, of an injection mold with associated mold slides and an introduced pole tooth assembly.

This injection mold is illustrated schematically in a partially sectioned state in FIG. 4 and has a base 10, a cover 9 and lateral mold slides 11 forming part of the mold. With these mold slides 11, the pole tooth assembly 20 arranged in the injection mold is centered during closing of the injection mold and brought to the desired diameter. With the aid of an injection-molding process in which a suitable plastic compound is injected into the cavity of the mold 8, the pole tooth assembly 20 arranged in the injection mold 8 and is finally encapsulated by casting. In the process, as shown in FIG. 4, the interspace between the individual windings 7 of the pole teeth 1 is cast. In addition, the space above and below the pole teeth 1 or pole tooth windings 7 is cast, with the result that continuous ring-shaped end walls 21, 22 or corresponding ring-shaped sections are formed.

Figure 5:
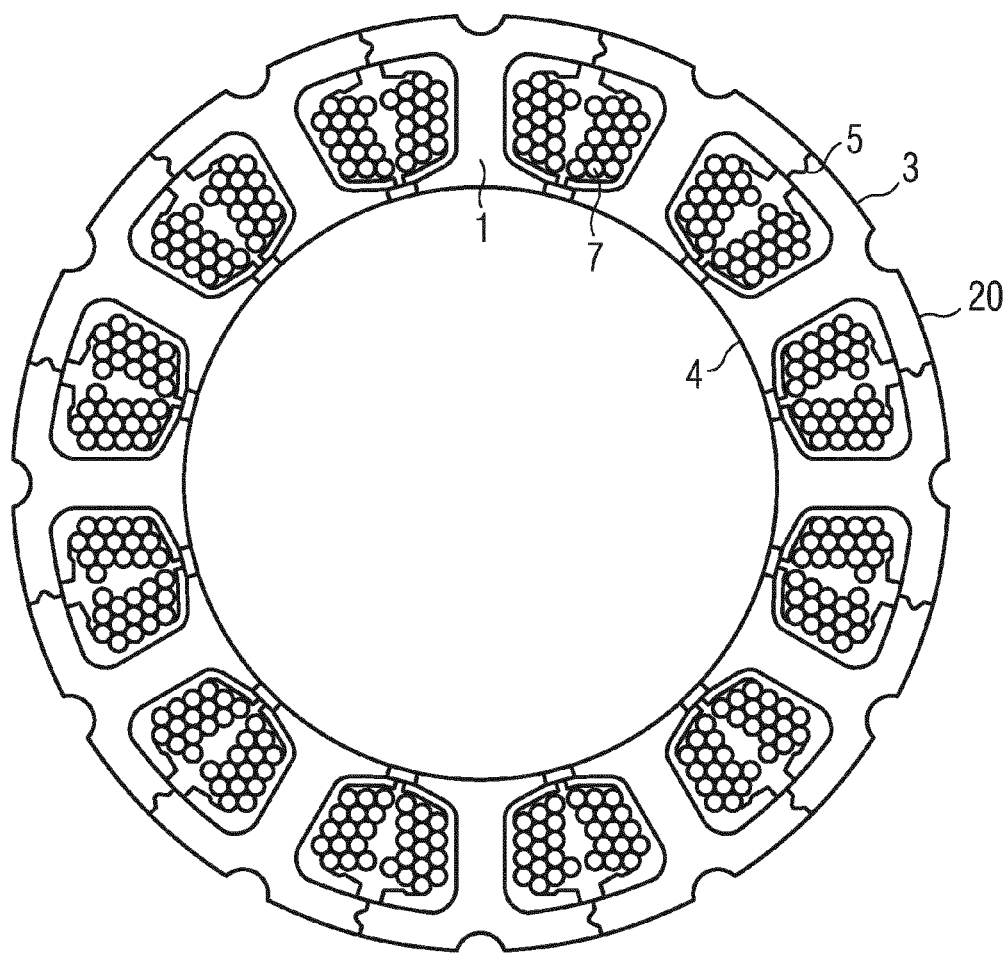
FIG. 5 is a cross section through a pole tooth assembly once it has been brought to the desired diameter and prior to the injection molding.

FIG. 5 shows a cross section through a pole tooth assembly 20 once said assembly has been centered and brought to the desired diameter. It can be seen that, in this end state, adjacent pole teeth 1 are fixed to one another via the corresponding tongue-and-groove joints 5.

FIG. 6 shows a longitudinal section through a finished stator that has been encapsulated by casting. In this case, the pole tooth assembly 20 is embedded in a plastic structure produced by the injection-molding process, which plastic structure comprises substantially intermediate walls 23 between the windings 7 of adjacent pole teeth 1, an upper continuous ring-shaped end wall 21 and a lower continuous ring-shaped end wall 22. The end walls or ring-shaped sections 21, 22 form an upper and lower encapsulation of the pole tooth ends or plastic caps 6. The outer faces of the inner and outer end-face walls 4, 3 remain bare and are not encapsulated by casting with plastic.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for producing a stator for an internal-rotor electric machine, comprising:
   providing a plurality of separate pole teeth each having a first end-face wall, a second end-face wall, and a pole tooth web connecting the first and second end-face walls;
   wrapping the plurality of separate pole teeth by forming a winding enveloping each pole tooth web;
   connecting respective winding wire ends of each of the plurality of separate pole teeth to produce a flexible ring-shaped pole tooth assembly;
   stabilizing the flexible ring-shaped pole tooth assembly by attaching an outer ring to the flexible ring-shaped pole tooth assembly;
   introducing the flexible ring-shaped pole tooth assembly into an injection mold after attaching the outer ring and centering the flexible ring-shaped pole tooth assembly in the injection mold;
   removing the outer ring from the flexible ring-shaped pole tooth assembly after the flexible ring-shaped pole tooth assembly is introduced into the injection mold;
   bringing the flexible ring-shaped pole tooth assembly to a desired diameter during closing of the injection mold using mold slides after introducing the flexible ring-shaped pole tooth assembly into the injection mold; and
   encapsulating the flexible ring-shaped pole tooth assembly by casting with a plastic compound such that respective regions between each pole tooth and regions above and below the plurality of separate pole teeth to form continuous end walls.

2. The method as claimed in claim 1, wherein each of the plurality of separate pole teeth is provided with at least one protective cap prior to the wrapping.

3. The method as claimed in claim 2, wherein the at least one protective cap is provided as insulation.

4. The method as claimed in claim 2, wherein the winding wire ends of the pole teeth are connected to one another via a welding process.

5. The method as claimed in claim 1, further comprising a welding process to connect the respective winding wire ends of the pole teeth to one another.

6. The method as claimed in claim 1, wherein the plurality of separate pole teeth are provided with an overmolding prior to the wrapping.

7. The method as claimed in claim 6, wherein the overmolding is provided as insulation.

8. The method as claimed in claim 1, wherein adjacent pole teeth are fixed to one another via tongue-and-groove joints.

9. The method as claimed in claim 1, wherein the internal-rotor electric machine is an electric motor.

\* \* \* \* \*